April 21, 1931.  F. S. BARKS  1,801,407
VALVE
Original Filed Sept. 8, 1928
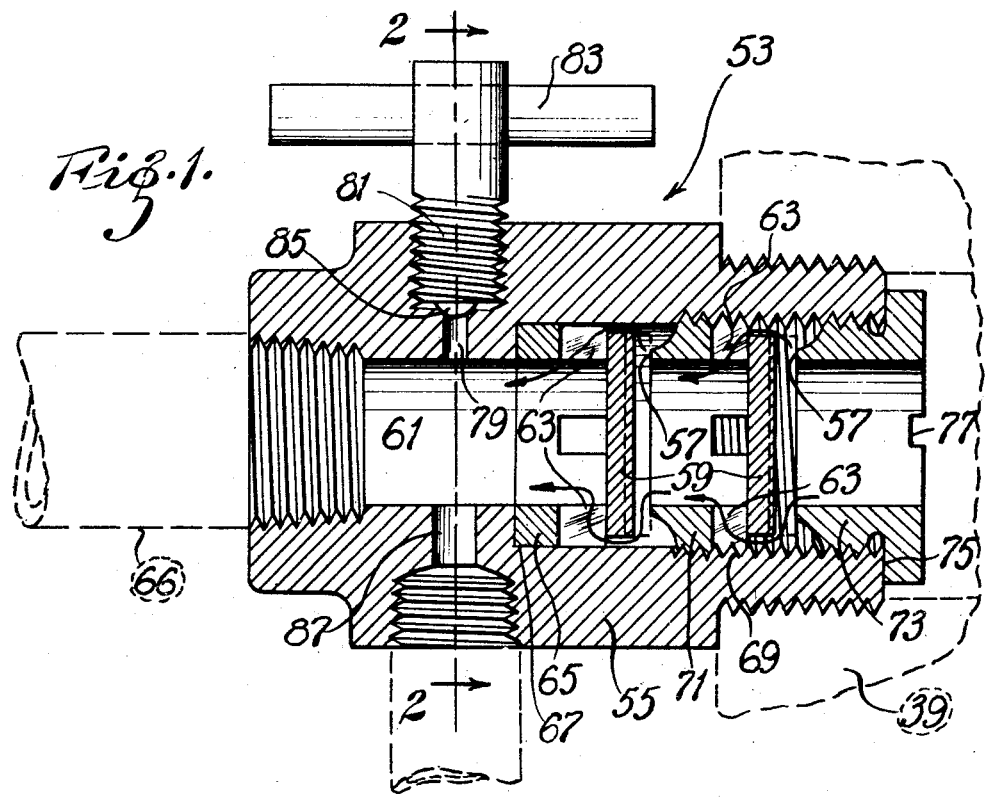
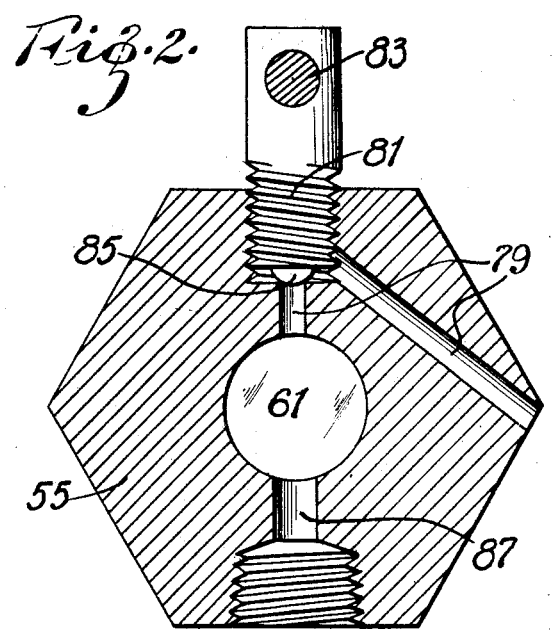
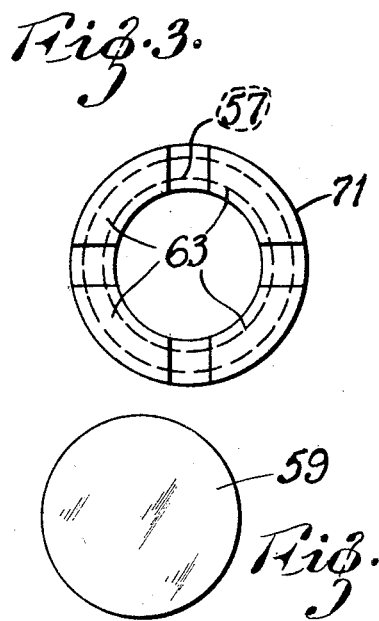
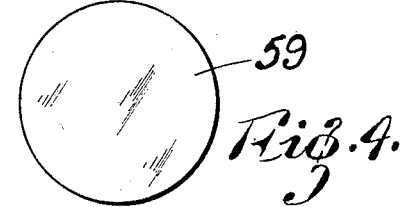
Frank S. Barks,
Inventor.
Delos G. Haynes,
Attorney Patented Apr. 21, 1931

1,801,407

UNITED STATES PATENT OFFICE

FRANK S. BARKS, OF ST. LOUIS, MISSOURI

VALVE

Original application filed September 8, 1928, Serial No. 304,831. Divided and this application filed October 1, 1928. Serial No. 309,462.

This invention relates to check valves, and with regard to certain more specific features to check valves for lubricating apparatus.

This invention is a division of the invention set out in my copending patent application, Serial No. 304,831, filed September 8, 1928.

Among the several objects of the present invention may be noted the provision of a simple and easily made check valve having improved valve and valve seating arrangements; the provision of a valve of the class described having a serial arrangement of check means for providing improved positive action; and the provision of a device of the class described which may be readily assembled and disassembled. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a longitudinal section taken through the valve;

Fig. 2 is a cross section taken on line 2—2 of Fig. 1;

Fig. 3 is a plan view of a certain castellated member; and

Fig. 4 is a plan view of a disc.

Similar reference characters indicate corresponding parts throughout the several views of the drawings.

Referring now more particularly to Fig. 1, there is illustrated at numeral 39 an outlet member from which grease is adapted to be pumped under pressure by means of the mechanism described in said parent application above referred to, or by any suitable pumping mechanism.

Numeral 53 indicates the valve per se and as a whole, screwed into the outlet of said member 39. The valve 53 comprises a body 55 within which are formed a plurality of serially arranged annular valve seats 57 adapted to be engaged by loose or floating, checking discs or valve members 59 upon a suction stroke of the plunger associated with the member 39 (not shown) so as to prevent return of grease through the valve bore 61. At a compression stroke of the plunger the discs 59 are forced forwardly against castellated peripheral portions 63 around the bore 61, said castellated portions being spaced from the seats 57 a distance adapted to permit enough movement of the discs 59 so that grease may pass upon a compression stroke. Upon compression, the grease passes through the passage 61, finding its way out around the valve seats 57 behind the discs 59 and passing around said discs and through the castellated portions.

The mountings of the various parts are improvedly effected as follows:

The outermost castellated portion 63 is formed in a ring member 65 forced into a recess or counterbore 67 machined in said bore 61. The inner wall of the member 65 provides a continuation of said bore 61. By this means it is possible to machine the castellated portions before application to the body 55, thus obtaining the most perfect results at least cost.

It will also be noted that the provision of the counterbore 67 also provides means for tapping the body 55, as indicated at numeral 69, so that an externally threaded member 71 may be screwed into the body 55 to provide the seat 57, said seat 57 being spaced from the wall of the counterbore. Said member 71 also has formed at the rear the other castellated portion 63, which also can be machined in an advantageous position outside of and before application to the body 55. The advantages of machining also apply to the seat 57. It will be seen that it is preferable that the length or depth of thread 69 be accurately determined so that the member 71 will bottom and be stopped at a point adapted to permit said play of the disc 59. It is also possible that the threaded fit be of a tight nature so that the member 71 may be adjusted to any position and remain there, thus obviating the necessity for accurately stopping off the thread 69.

Inasmuch as the thread 69 continues out to the rear end of the valve, it provides means for accommodating an externally threaded member 73 which is formed with said second seat 57. However, inasmuch as this member is not adapted to bottom in the thread 69, it is provided with a shoulder 75 for accurately determining its position, whereby the desirable movement play of the rearward disc 59 is effected. Recesses 77 are provided in the shoulder 75 for applying a spanner wrench. In this regard it will be noted that the castellated portion 63 of the member 71 may have a wrench applied thereto for forcing it home.

In Fig. 1 the discs are shown as being centralized. This is not an exaggerated condition because when grease is forced outwardly (to the left as indicated by the arrows) it flows around the discs and tends to centralize them. When the pressure in member 39 decreases and the back pressure from the outlet of the valve returns the discs from their solid line positions to their dotted line positions against the seats 57, they do not tend to become positioned sidewardly, because the grease passing through the valve is of a more or less stiff nature. However, even though liquid is used, or a gas, the discs are made large enough to cover the seats even though they rest on one side of the body 55.

In Fig. 1 the valve is shown as communicating with an outlet 66.

Figs. 1 and 2 illustrate the application of a relief cock to this valve comprising an outlet 79 from the bore 61. The outlet is intersected by a threaded plug 81 having a handle 83 and a ball nose 85. The nose seats in the bore 79 and when the plug 81 is retracted opens the bore 79 to permit release of pressure. Another opening 87 from the bore 61 permits outlet of grease for certain pressure control purposes not forming part of this invention.

It is to be noted in connection with this valve that it has no return springs. This is because advantage is taken of the inherent tendency of the pumped grease to re-expand into the member 39. This expansion is in part due to the fact that grease is itself under compression and the fact that the outlet 66 is usually in connection with a flexible rubber line which exerts a back pressure when carrying an internal pressure, due to its own expansive properties. It will be understood that that pressure may occur for other reasons.

It is to be understood that although the shape of values 59 is shown circular in the drawings that they may be of any shape permitting at least some space between their edges and the counterbored portion 67 of the opening 61.

It is also to be understood that the term "castellated" is to be defined to include any shape of the right-hand portions of members 65 and 71 which will permit passage of grease to the left although the discs 59 are seated to the left.

The advantage of this construction is its simplicity and positive action, inasmuch as the discs 59 are not both apt to get dirt under them at the same time, so that one acts as a safety device for the other. A greater number of discs, seats and castellated elements may be used if desired or only one set may be used. A spring may be used behind one or more of the discs, if desired.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A check valve comprising a body, an opening therethrough including a counterbore, a castellated member forced to the bottom of a counterbore, said counterbore being threaded to a predetermined depth, a member threaded into the threaded counterbore carrying a valve seat facing said castellated member and spaced from the counterbore, said last-named member carrying a castellated portion opposite the valve seat, a second shouldered member threaded into said counterbore to a depth predetermined by said shoulder and carrying a second valve seat facing the castellated portion of the first-named member and spaced from the counterbore, and floating discs between said seats and the castellated portions, the distances between the seats and castellated portions permitting movement of said discs.

2. A check valve comprising a body, an opening therethrough including a counterbore, a castellated member forced to the bottom of a counterbore, said counterbore being threaded, a member threaded into the threaded counterbore carrying a valve seat facing said castellated member, said last-named member carrying a castellated portion opposite the valve seat, a second member threaded into said counterbore and carrying a second valve seat facing the castellated portion of the first-named member, and movable members between said seats and the castellated portions, the distances between the seats and castellated portions permitting movement of said movable members.

3. A check valve comprising a body, an opening therethrough, a castellated portion in said opening, said opening being threaded, a member threaded into the threaded opening carrying a valve seat facing said castellated portion, said last-named member carrying a castellated portion opposite the valve seat, a second member removably formed in the opening and carrying a second valve seat facing the castellated portion of the first-named member, and movable valve members between said seats and the castellated portions, the distance between the seats and castellated portions permitting movement of said valve members.

In testimony whereof, I have signed my name to this specification this 25th day of September, 1928.

FRANK S. BARKS.